United States Patent
Tomioka et al.

(10) Patent No.: US 6,383,646 B1
(45) Date of Patent: May 7, 2002

(54) SANITARY WARE AND PROCESS FOR PRODUCING SAME

(75) Inventors: Yutaka Tomioka; Satoshi Horiuchi; Shingo Kasahara; Katsuhiro Kawakami; Toru Ueno; Hiroyuki Takada; Yukinari Matsumoto; Narumitsu Suda; Shigeyuki Yamada, all of Fukuoka (JP)

(73) Assignee: Toto Ltd., Fukuoka (JP)

( * ) Notice: Subject to any disclaimer, the term of this patent is extended or adjusted under 35 U.S.C. 154(b) by 0 days.

(21) Appl. No.: 09/704,003

(22) Filed: Nov. 1, 2000

Related U.S. Application Data

(63) Continuation of application No. PCT/JP00/03972, filed on Jun. 16, 2000.

(30) Foreign Application Priority Data

Jun. 18, 1999 (JP) .............................. 11-172123

(51) Int. Cl.$^7$ .............................. B32B 17/06; B05D 3/00
(52) U.S. Cl. ....................... 428/428; 428/432; 428/688; 427/372.2; 427/376.2
(58) Field of Search ................... 428/428, 688, 428/699, 432; 501/14, 141; 106/31.01; 427/372.2, 376.2; 4/619

(56) References Cited

U.S. PATENT DOCUMENTS

| | | | | |
|---|---|---|---|---|
| 3,840,394 A | * | 10/1974 | Eppler | 117/125 |
| 5,304,516 A | * | 4/1994 | Clifford | 501/21 |
| 5,882,808 A | * | 3/1999 | Oku et al. | 428/699 |
| 5,962,353 A | * | 10/1999 | Schweizer et al. | 501/20 |
| 5,976,999 A | * | 11/1999 | Evans et al. | 501/17 |
| 6,114,054 A | * | 9/2000 | Klein et al. | 428/689 |

FOREIGN PATENT DOCUMENTS

| | | |
|---|---|---|
| JP | 63-195157 | 8/1988 |
| JP | 5194012 | 8/1993 |
| JP | 632682 | 2/1994 |

* cited by examiner

Primary Examiner—Blaine Copenheaver
Assistant Examiner—Gwendolyn Blackwell-Rudasill
(74) Attorney, Agent, or Firm—Carrier, Blackman & Associates, P.C.; Joseph P. Carrier; William D. Blackman

(57) ABSTRACT

Sanitary ware which strongly resists adhesion of dirt and which may be easily cleaned with a weak flow of water, over a long period of time, comprises a first coloring glaze layer formed on the surface of a ceramic body, a second transparent glaze layer formed on the first glaze layer, and an engobe layer formed between said body surface and said first glaze layer.

18 Claims, 2 Drawing Sheets

SANITARY WARE AND PROCESS FOR PRODUCING SAME

This application is a continuation of International Application No. PCT/JP00/03972, now International Publication Document No. WO 00/78689 A1 filed Jun. 16, 2000.

BACKGROUND OF THE INVENTION

1. Field of the Invention

The present invention relates to sanitary ware, such as toilet bowls, urinals, wash basins and washstands, and the production thereof so as to maintain a function which allows the easy removal of dirt over a long period of time.

2. Description of Related Art

It is essential that the surfaces of sanitary ware have good appearance and they may be cleaned for the sake of sanitation and esthetics. Moreover, It is preferable that this condition be preserved over a long period of time.

In order to maintain sanitary cleaning and good appearance, a cleanser of surfactants, acids, alkalis, and the like is typically applied to various types of scrub brushes and the surface of the sanitary ware is strongly scraped therewith. In short, dirt is removed through the force of chemical cleaning by a cleanser and the force of physical cleaning by scraping with brushes.

Unfortunately, it is hard to call this kind of cleaning work easy, so it is preferable to minimize the frequency of this work. Moreover, since it has been shown in recent years that surfactants included in wastewater contribute to environmental pollution, low amount and frequency of use thereof is preferable.

In light of such circumstances, sanitary ware have been proposed which have surf aces that are outstanding from the aspects of sanitation and good appearance.

For example, proposals have been made for methods to make it difficult for dirt to stick to sanitary ware surfaces by coating the surfaces with fluorine resins or siloxane resins having fluoroalkyl groups so as to decrease the surface energy thereof.

In addition, a method has been proposed to prevent strong adhesion of dirt to the sanitary ware surfaces by making the surfaces as smooth as possible. However, there has heretofore been insufficient study made of the relationship between surface conditions and difficulty of dirt adhesion, durability, or degree of gloss. There are only proposals for sanitary ware with flat and smooth surfaces based on conceptual awareness of good appearance and there are no proposals for the concrete means to achieve such characteristics.

SUMMARY OF THE INVENTION

The present inventors have become aware that sanitary ware, on which dirt adheres with extreme difficulty and, once it adheres, is removed with a weak flow of water, can be obtained without accompanying poor appearance by devising a structure of glazed layers.

In the embodiments of the present invention, the object is to provide sanitary ware which, without accompanying poor appearance, allows dirt to adhere with extreme difficulty and, once it adheres, to be removed with a weak flow of water.

In addition, according to the present invention, there is provided sanitary ware comprising a first coloring glaze layer formed on a ceramic body surface, a second transparent glaze layer formed on the first layer, and an engobe layer formed between the ceramic body surface and the first layer.

In the present invention, the term "sanitary ware" means an equipment used in the vicinity of rest rooms, specifically meaning toilets, urinals, strainers for urinals, toilet tanks, wash basins of wash stands, hand wash basins, etc.

"50% particle diameter" means the particle diameter of particles in a case where an accumulated volume of the particles from a smaller particle based on the particle distribution measurement data derived through the use of a laser diffraction method reaches to 50%.

"Centerline average roughness Ra" is, extracting the measured length 1 from the roughness curve to the direction of the centerline thereof, making the centerline of this extracted part X axis, making the direction of the axial magnification Y axis, and expressing the roughness curve as y=f(x), the value in micrometers ($\mu$m) obtained by the following equation:

$$Ra = \frac{1}{l}\int_0^l |f(x)| dx \qquad [\text{Equation 1}]$$

The measurement of the centerline average roughness Ra, following the definitions and notations of JIS-B00601 (1994), was conducted by using stylus-type surface roughness measurement apparatus which is in compliance with JIS-B0651 (1996). These JIS standards, along with their English translations, can be easily obtained from Japan Industrial Standards (address: 1–24, Akasaka 4-chome, Minato-ku, Tokyo 107-0052 Japan).

A schematic diagram of this measurement apparatus is shown in FIG. 2. In the FIG. 2, a detector 11 is equipped with a stylus 12 and a skid 13, and the detector 11, into which surfaces of a sample 14 on a fixing device 15 are fed with a feeder 16, detects displacements in the vertical direction. The surface roughness curve can be obtained by displaying these displacements with a magnification device (not shown) on an indicating device or recording device.

DESCRIPTION OF THE PREFERRED EMBODIMENTS

Figure 1:
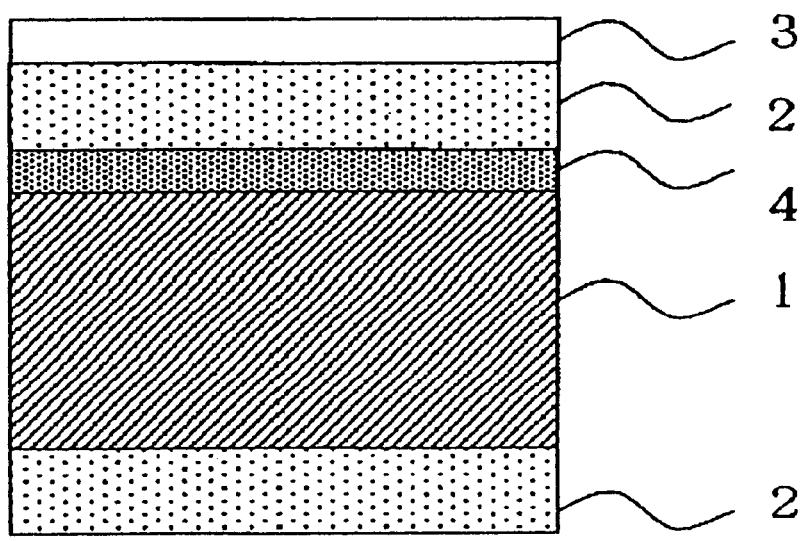
FIG. 1 is a schematic diagram showing the surface structure of an embodiment of the sanitary ware according to this invention.
Figure 2:
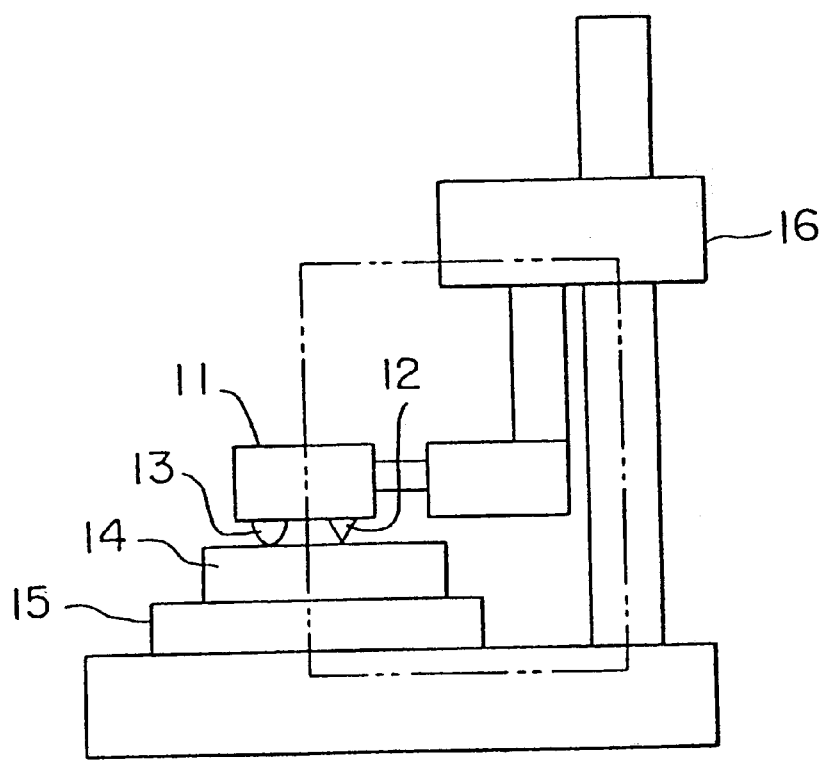
FIG. 2 is a schematic diagram of the stylus-type surface roughness measurement apparatus that is in compliance with JIS-B0651 (1996).

In the sanitary ware according to the present invention, a first coloring glaze layer is formed on the surface of the ceramic body, a second transparent layer is formed on the first layer, and an engobe layer is formed between the surface of the ceramic body and the first layer.

In general, only one coloring glaze layer is formed on the surface of sanitary ware. In such case, a particulate coloring component such as opacifier particles or pigment particles forms unevenness on the surface of the glaze. Therefore, to the best of the present inventors' knowledge, in the field of sanitary ware, ceramics having a surface roughness with Ra of at most about 0.1 $\mu$m are being sold.

In the present invention, a second transparent glaze layer is formed on a first coloring glaze layer, so as to reduce uneveness formed by the above-mentioned particulate substance. As a result of this, the Ra of the second glaze layer, that is the surface glaze layer, is less than 0.07 $\mu$m.

The sanitary ware of the present invention having the above-mentioned structure is such that it is difficult for dirt such as yellowing, feces, mold, urolith, or the like to adhere and, even if it were to adhere, it would be washed away with a weak flow of water. As a result of this, it is possible over long periods of time to keep the surface of the glaze clean without frequent cleaning operations. It was conventional wisdom that dirt adheres with difficulty to flat and smooth surfaces; however, the degree of this effect, from the standpoint of conventional wisdom, is extremely conspicuous and is surprisingly beyond anticipation. For example, with sanitary ware according to the present invention, dirt due to a permanent marker floats up when it comes into contact with water and is removed by a flow of water. The same is true for salad oil. Moreover, adhesion of furring and urolith is extremely difficult, and even if adhesion does occur, it is easily removed. This high degree of difficulty of adhesion and ease of dirt removal was totally impossible to expect with conventional wisdom.

On the other hand, it was not easy to form the "two-layered glaze structure" sanitary ware having a second transparent glaze layer on a first coloring glaze layer. It turned out that, with regards to toilets, wash basins, and similar large-scale complicated-shaped sanitary ware having raw materials used in conventional sanitary ware (taking as the main raw materials natural raw materials such as silicate sand (quartz) and feldspar, and adding, for the sake of coloring, zircon and pigments to act as opacifiers), trying to form the "two-layered structure" in which a second transparent glaze layer is formed on a first coloring glaze layer formed on the ceramic body, in the firing process, the second transparent glaze layer fused sooner than the first glaze layer with the rising temperature. Further the large amount of gas generated from the body at a higher temperature than the fusion temperature of the second glaze layer is blocked with the second glaze layer, making it difficult to be released to the outside, and inviting the poor exterior appearance of spot designs which accompany air bubble residues, and deterioration in the flatness and the smoothness due to local surface rising which accompanies air bubble residues.

Therefore, in the present invention, an engobe layer is formed between the ceramic body and the first coloring glaze layer. By interposing the engobe layer, along with minimizing the undesirable influence on the first and second glaze caused by the generation of gas and the occurrence of poor appearance due to spots, it became possible to prevent damage to the flatness and the smoothness of the second layer surface due to influence of the above-mentioned gas.

According to the wisdom obtained by the inventors, the effect of the present invention will not be greatly influenced by the glaze compositions; however, the range of preferable and more preferable compositions is as shown as mentioned below.

With regards to the following compositions, opacifier zircon and pigment are not included in the comparisons. In a case of comparing the composition of the second transparent layer and the composition of the first coloring layer except opacifiers and pigments, increasing the $Al_2O_3$ and $SiO_2$ components contained in the second layer, production becomes easy since the range of temperature at which firing without production defects can be achieved broadens.

Preferable Compositions for First Coloring Glaze Layer

|  | Preferable range (weight %) | More preferable range (weight %) |
|---|---|---|
| $SiO_2$ | 52 to 80 | 57 to 80 |
| $Al_2O_3$ | 5 to 14 | 5 to 12 |
| $Fe_2O_3$ | 0 to 0.4 | 0 to 0.4 |
| MgO | 0.5 to 4.0 | 0.5 to 3.5 |
| CaO | 6 to 17 | 8 to 17 |
| ZnO | 3 to 11 | 3 to 10 |
| $K_2O$ | 1 to 5 | 1 to 5 |
| $Na_2O$ | 0.5 to 2.5 | 0.5 to 2.5 |
| $ZrO_2$ | 0.1 to 15 | 0.1 to 15 |
| Pigment | 0.001 to 20 | 0.001 to 20 |

Preferable Compositions for Second Transparent Glaze Layer

|  | Preferable range (weight %) | More preferable range (weight %) |
|---|---|---|
| $SiO_2$ | 53 to 82 | 58 to 82 |
| $Al_2O_3$ | 5.5 to 16 | 6 to 16 |
| $Fe_2O_3$ | 0 to 0.4 | 0 to 0.4 |
| MgO | 0.5 to 4.0 | 0.5 to 3.5 |
| CaO | 6 to 17 | 6 to 15 |
| ZnO | 3 to 11 | 3 to 10 |
| $K_2O$ | 1 to 5 | 1 to 5 |
| $Na_2O$ | 0.5 to 2.5 | 0.5 to 2.5 |

The thickness of the second transparent glaze layer may be set as desired, but about from 0.1 mm to 0.5 mm is preferable and 0.15 mm to 0.4mm is more preferable.

In addition, the thickness of the first coloring glaze layer may be set as desired, but about from 0.1 mm to 1.0 mm is preferable and 0.2 mm to 0.7 mm is more preferable. Such thickness means that production defects such as hairline fissures and glaze scaling will not easily arise.

Within the second transparent glaze layer may be added anti-bacterial metals such as silver, copper zinc, compounds thereof, or solid solutions. As a result of this, anti-bacterial functions can be called forth.

According to a preferred embodiment of the present invention, the engobe layer formed between the ceramic body surface and the first glaze layer is made to be a dense layer having a lower porosity than the ceramic body.

By this, the engobe layer has a blocking function to prevent growth of pinholes caused by gas from the ceramic body in the course of passing through the first glaze layer or the first and second glaze layers. It becomes much less likely that a poor appearance such as spots will occur and it is possible to prevent damage to the flatness and the smoothness of the second glaze layer caused by the gas.

In the preferred embodiment of the present invention, on at least one part of the sanitary ware, a part on which an engobe layer is not formed is provided.

By providing a part on which an engobe layer is not formed, influences of the gas from the ceramic body can be easily and effectively controlled. Moreover, production costs will be decreased.

In the preferred embodiment of the present invention as shown in FIG. 1, an engobe layer 4 is formed mainly on a part of a ceramic body 1 wherein the first glaze layer 2 is formed on both sides of the ceramic body surface and also the engobe layer 4 is formed only on one side of the ceramic body surface. A second or transparent glaze layer is indicated at 3.

By doing so, influences of the gas from the ceramic body on important parts for external appearance such as a part in which washbasin bowls is formed, can be more effectively controlled.

The sanitary ware according to the present invention are in the form of toilets, specifically, toilet bowls, urinals, strainers for urinals, or the like, as mentioned above. Dirt such as yellowing of toilet bowls, traps, and lower surfaces of rims is effectively prevented or easily removed. Moreover, the sanitary ware according to the present invention are in the form of washstand basins or hand washing basins. Soap fouling, water scum fouling, or the like, of the bowl portions of wash basins or hand washing basins is effectively prevented or easily removed.

According to the preferred embodiment of the present invention, sanitary ware are produced with processes comprising the steps of: applying raw materials to a formed body of a sanitary ware base in order to form an engobe layer, applying coloring glaze raw materials onto the engobe layer in order to form a first glaze layer, applying transparent glaze raw materials onto the first glaze layer in order to form a second glaze layer, and firing.

Conventionally known ceramic bodies may be used as the body of a sanitary ware base mentioned above. That is, a body slip for sanitary ware made by mixing raw materials such as silica sand, feldspar, clay, or the like may be properly formed.

As raw materials to form the engobe layer, the same materials (pottery stone, clay, feldspar and other naturally occurring minerals particles) used to form normal bodies may be mixed.

A preferable composition of raw materials used to form the engobe layer is: 30% to 50% pottery stone, 30% to 50% clay, and 10% to 30% flux.

By using 30% to 50% pottery stone, 30% to 50% clay, and 10% to 30% flux, proper conditions of fusion and heating of the engobe may be obtained and the function to block gas from the body will be stable. In addition, it is preferable that the 50% particle diameters (D50) of the raw material powders used to form the engobe layer be less than or equal to 6 μm. Such particle diameters can be obtained by mixing raw materials of the above-mentioned composition with a ball mill or the like, and by milling as needed.

By making the 50% particle diameters (D50) less than or equal to 6 μm, the engobe layer can more easily become a dense layer with a porosity less than the ceramic body layer below, making it easier to maintain the function of blocking gas from the body.

The raw materials to form the engobe layer may be applied to all or one part of the formed body when applied to the surface of the formed body of the sanitary ceramic base. One part of the formed body is, for example, the bowl surface, the trap, the back side of the lower surface of the portion which is located above the bowl surface and constructs a water path for flush water, and other easily dirtied parts of the toilet. As application methods, commonly known methods such as spray coating, flow coating, printing, or the like may be used.

The coloring glaze raw materials used to form the first glaze layer are a mixture of naturally occurring mineral particles including silica sand, feldspar, and limestone; non-crystalline glazes; or raw materials including mixtures of these materials to which pigments and/or opacifiers are added.

The pigments include, for example, cobalt compounds and iron compounds. The opacifiers include, for example, zircon and tin oxide.

The non-crystalline glazes are glaze raw materials compounded from the above-mentioned naturally occurring mineral particles and the like, and fused to be glassified at high temperatures. For example, it is possible that frit glaze may be suitable for use.

For methods to apply onto the engobe layer the coloring glaze raw materials which are to form the first glaze layer, commonly known methods such as spray coating, flow coating, and printing may be used. In particular, wet process spray coating or flow coating is preferable because scaling of the glaze does not easily arise.

For the transparent raw materials to form the second glaze layer, any of the following may be used as desired: (1) non-crystalline glaze, (2) mixture of non-crystalline glaze and naturally occurring mineral particles (in this case, the percentage of non-crystalline glaze in the total sum of both is preferably from 50% to 99%, and more preferably would be from 60% to 95%), and (3) naturally occurring mineral particles ground to 6 μm or less in 50% particle diameters (D50).

The above-mentioned transparent glaze is applied to all or one part of the first glaze layer. Preferably, one part means, for example, the bowl surface, the trap, the lower surface of the rim and other easily dirtied parts of the toilet.

For methods to apply onto the first glaze layer the transparent glaze raw materials to form the second glaze layer, commonly known methods such as spray coating, flow coating, and printing may be used. In particular, dry process spray coating is preferable.

In a firing process, firing is conducted at the temperature in the range of 800° C. to 1300° C. By doing so, the body and the engobe are heated, and the two glaze layers are fixed, thereby obtaining a sanitary ware surface having excellent flatness and smoothness.

Presented below are two examples of sanitary ware according to the invention, two comparison examples nor according to the invention, and a Table showing the results of the four examples.

EXAMPLES

Comparison 1

TABLE 1

| Glaze raw material | Weight percent |
|---|---|
| $SiO_2$ | 55 to 80 |
| $Al_2O_3$ | 5 to 13 |
| $Fe_2O_3$ | 0.01 to 0.4 |
| MgO | 0.8 to 3.0 |
| CaO | 8 to 17 |
| ZnO | 3 to 8 |
| $K_2O$ | 1 to 4 |
| $Na_2O$ | 0.5 to 2.5 |
| $ZrO_2$ | 0.1 to 15 |
| Pigment | 0.001 to 20 |

2 kilograms of the coloring glaze raw material having the composition shown in Table 1, 1 kilogram of water, and 4 kilograms of flint ball were put into a ceramic pot with a volume of 6 liters. By milling with a ball mill, the particle size measurement result of the coloring glaze slurry found by a laser diffraction particle size analyzer was made to be as follows: 65% being 10 μm or less and the 50% average particle diameter (D50) being about 6.5 μm or less. The glaze slurry obtained here is referred to as Glaze A.

Next, using a ceramic body slip for sanitary ware which was obtained by mixing silica sand, feldspar, clay, etc. as raw materials, an under-counter type wash basin which has a bowl surface that does not require glazing on the back surface was made. Glaze A was applied by the spray-coating method, and afterward, a sample was obtained by firing at 1100° C. to 1200° C.

The roughness of the glazed surface (Ra) was measured and appearance defects in the product were confirmed on the wash basin thus obtained.

The surface roughness was measured by using a stylus-type surface roughness measurement apparatus (JIS-BO651) and the centerline surface roughness (Ra) was measured.

Appearance defects in the product were confirmed by visual inspection.

Comparison 2

TABLE 2

| Glaze raw material | Weight percent |
| --- | --- |
| $SiO_2$ | 52 to 76 |
| $Al_2O_3$ | 6 to 14 |
| MgO | 0.5 to 4.0 |
| CaO | 6 to 17 |
| ZnO | 3 to 11 |
| $K_2O$ | 1 to 5 |
| $Na_2O$ | 0.5 to 2.5 |

2 kilograms of the transparent glaze raw materials which was obtained by mixing the raw materials having the composition shown in Table 2 and non-crystalline glaze so that the percentage of the non-crystalline glaze in the total sum of both is from 50 weight % to 99 weight %, 1 kilogram of water, and 4 kilograms of flint ball were put into a ceramic pot with a volume of 6 liters. By milling with a ball mill, the particle size measurement result of the transparent glaze slurry found by a laser diffraction particle size analyzer was as follows: 67% being 10 μm or less and the 50% average particle diameter (D50) being about 6.0 μm or less. The glaze slurry obtained here is referred to as Glaze B.

Next, using a ceramic body slip f or sanitary ware which was obtained by mixing silica sand, feldspar, clay, etc. as raw materials, a wall-mounted type wash basin which has a bowl surface that requires glazing on the back surface was made. Glaze A is applied as an undercoat layer by the spray-coating method, and Glaze B is applied thereon as an overcoat layer. Afterward, a sample was obtained by firing at 1100° C. to 1200° C.

The roughness of the glazed surface (Ra) was measured and appearance defects in the product were confirmed on the wash basin thus obtained.

The surface roughness was measured by using a stylus-type surface roughness measurement apparatus (JIS-BO651) and the centerline surface roughness (Ra) was measured.

Appearance defects in the product were confirmed by visual inspection.

Example 1

2 kilograms of the engobe raw materials (30% to 50% pottery stone, 30% to 50% clay, and 10% to 30% feldspar), 2 kilograms of water, and 4 kilograms of flint ball were put into a ceramic pot with a volume of 6 liters. By milling with a ball mill, the particle size measurement result of the coloring glaze slurry found by a laser diffraction particle size analyzer was made to be as follows: 62% being 10 μm or less and the 50% average particle diameter (D50) being about 7.0 μm or less. The engobe raw material slurry obtained here is referred to as Slurry C.

Next, using a ceramic body slip for sanitary ware which was obtained by mixing silica sand, feldspar, clay, etc. as raw materials, a wall-mounted type wash basin which has a bowl surface that requires glazing on the back surface was made. Slurry C was applied onto the front surface of the bowl to form an engobe layer, using the spray coating method.

In addition, Glaze A is applied to a desired part including both front and back surfaces of the bowl as an undercoat layer by the spray-coating method, and Glaze B is applied to a desired part excluding the back surface of the bowl as an overcoat layer. Afterward, a sample was obtained by firing at 1100° C. to 1200° C.

The roughness of the glazed surface (Ra) was measured and appearance defects in the product were confirmed on the wash basin thus obtained.

The surface roughness was measured by using a stylus-type surface roughness measurement apparatus (JIS-BO651) and the centerline surface roughness (Ra) was measured.

Appearance defects in the product were confirmed by visual inspection.

Example 2

2 kilograms of the engobe raw materials (30% to 50% pottery stone, 30% to 50% clay, and 10% to 30% feldspar), 2 kilograms of water, and 4 kilograms of flint ball were put into a ceramic pot with a volume of 6 liters. By milling with a ball mill, the particle size measurement result of the coloring glaze slurry found by a laser diffraction particle size analyzer was made to be as follows: 71% being 10 μm or less and the 50% average particle diameter (D50) being about 5.0 μm or less. The engobe raw material slurry obtained here is referred to as Slurry D.

Next, using a ceramic body slip for sanitary ware which was obtained by mixing silica sand, feldspar, clay, etc. as raw materials, a wall-mounted type wash basin which has a bowl surface that requires glazing on the back surface was made. Slurry D was applied onto the front surface of the bowl to form an engobe layer, using the spray coating method.

In addition, Glaze A is applied to a desired part including both front and back surfaces of the bowl as an undercoat layer by the spray-coating method, and Glaze B is applied to a desired part excluding the back surface of the bowl as an overcoat layer. Afterward, a sample was obtained by firing at 1100 ° C. to 1200 ° C.

The roughness of the glazed surface (Ra) was measured and appearance defects in the product were confirmed on the wash basin thus obtained.

The surface roughness was measured by using a stylus-type surface roughness measurement apparatus (JIS-BO651) and the centerline surface roughness (Ra) was measured.

Appearance defects in the product were confirmed by visual inspection.

Each result is shown in Table 3. It turned out that, by applying engobe having the function of blocking gas from the body to the body surface and thereby forming an engobe layer prior to applying a coloring glaze layer or a coloring glaze layer and a transparent glaze layer, independent of the form of the product, a spot designs do not readily occur on part to which the glaze layer(s) were applied.

TABLE 3

|  | Appearance | Surface roughness (Ra) |
| --- | --- | --- |
| Comparison 1 | Good | 0.110 μm |
| Comparison 2 | Somewhat partial spot | 0.060 μm |

TABLE 3-continued

|  | Appearance | Surface roughness (Ra) |
|---|---|---|
| Example 1 | Mostly good | 0.055 μm |
| Example 2 | Bood | 0.050 μm |

INDUSTRIAL APPLICABILITY

According to the present invention there is provided, independent of the form of a product, sanitary ware with a coloring glaze layer for good appearance which maintains the function of allowing the easy removal of dirt over a long period of time over a long period of time the easy removal of dirt can be provided.

Although there have been described in detail what are the present embodiments of the invention, it will be understood by persons skilled in the art that variations and modifications may be made thereto without departing from the gist, spirit or essence of the invention. The scope of the invention is indicated by the appended claims

What is claimed is:

1. Sanitary ware comprising:
   a first coloring glaze layer formed on a surface of a ceramic body;
   a second transparent glaze layer formed on said first glaze layer; and
   an engobe layer formed between said ceramic body surface and said first glaze layer; wherein a surface roughness of said second glaze layer is less than 0.07 μm when measured by a stylus-type surface roughness apparatus.

2. Sanitary ware defined in claim 1, wherein said first coloring glaze layer includes particulate substances of at least one of opacifier particles and pigment particles.

3. Sanitary ware defined in claim 1, wherein said engobe layer has a porosity less than said ceramic body.

4. Sanitary ware defined in claim 1, wherein said ceramic body has at least one part with said engobe layer not formed thereon.

5. Sanitary ware defined in claim 1, wherein said engobe layer is formed mainly on a part of the ceramic body in which said first glaze layer is formed on both sides of said body surface and said engobe layer is formed only on one of the sides of the body surface.

6. A process of producing sanitary ware as defined in claim 1, comprising the steps of:
   applying raw materials to a surface of a formed body of a sanitary ware base to form an engobe layer thereon;
   applying coloring glaze raw materials to said engobe layer to form a first glaze layer on said engobe layer; and
   applying transparent glaze raw materials to said first glaze layer to form a second glaze layer on said first glaze layer; and
   firing said base, said engobe layer, and said first and second glaze layers.

7. A process of producing sanitary ware defined in claim 6, wherein raw materials used to form said engobe layer are powdered raw materials with 50% particle diameters of 6 μm or less.

8. A process of producing sanitary ware defined in claim 6, wherein raw materials used to form said engobe layer are composed of 30% to 50% pottery stone, 30% to 50% clay, and 10% to 30% flux.

9. A process of producing sanitary ware defined in claim 6, wherein said base has at least one part with said engobe layer not formed thereon.

10. A process of producing sanitary ware defined in claim 6, wherein said step of forming said engobe layer involves forming said engobe layer mainly on a part of the sanitary ware base in which said first glaze layer is formed on both sides of said body surface and said engobe layer is formed only on one of the sides of the body surface.

11. Sanitary ware defined in claim 1, wherein said ceramic body, said engobe layer and said first and second glaze layers are simultaneously fired at 800° C. to 1300° C.

12. A process of producing sanitary ware defined in claim 6, wherein said sanitary ware base, said engobe layer and said first and second glaze layers are simultaneously fired at 800° C. to 1300° C.

13. Sanitary ware defined in claim 2, wherein said engobe layer has a porosity less than said ceramic body.

14. Sanitary ware defined in claim 2, wherein said ceramic body has at least one part with said engobe layer not formed thereon.

15. Sanitary ware defined in claim 14, wherein said engobe layer has a porosity less than said ceramic body.

16. Sanitary ware defined in claim 3, wherein said ceramic body has at least one part with said engobe layer not formed thereon.

17. Sanitary ware defined in claim 1, wherein a surface roughness of said second glaze layer is less than 0.07 μm when measured by a stylus-type surface roughness apparatus.

18. A process of producing sanitary ware defined in claim 6, wherein said engobe layer has a porosity less than said ceramic body.

* * * * *

UNITED STATES PATENT AND TRADEMARK OFFICE
CERTIFICATE OF CORRECTION

PATENT NO.     : 6,383,646 B1
DATED          : May 7, 2002
INVENTOR(S)    : Tomioka et al.

It is certified that error appears in the above-identified patent and that said Letters Patent is hereby corrected as shown below:

Column 1,
Line 17, change "It" to -- it --.
Line 33, change "surf aces" to -- surfaces --.

Column 2,
Line 60, change "uneveness" -- unevenness --.

Column 3,
Line 40, after "glaze" insert -- layers --.

Column 4,
Line 36, between "copper" and "zinc" insert a comma.
Line 60, after "surface" insert a comma.
Line 65, after "appearance" insert a comma.
Line 66, change "is" to -- are --.

Column 5,
Line 25, change "minerals" to -- mineral --.
Line 33, begin a new paragraph with "In addition,".

Column 6,
Line 25, change "a" to -- the --; change "the" to -- a --.
Line 31, change "nor" to -- of sanitary ware not --.

Column 7,
Line 35, change "f or" to -- for --.

Column 8,
Line 59, after the comma delete "a".
Line 60, before "part" insert -- a --.

UNITED STATES PATENT AND TRADEMARK OFFICE
CERTIFICATE OF CORRECTION

PATENT NO.    : 6,383,646 B1
DATED         : May 7, 2002
INVENTOR(S)   : Tomioka et al.

It is certified that error appears in the above-identified patent and that said Letters Patent is hereby corrected as shown below:

Column 9,
Line 6, change "Bood" to -- Good --.
Line 15, delete "over a long period of time the easy removal".
Line 16, delete "of dirt can be provided".

Column 10,
Line 2, delete "and".

Signed and Sealed this

Nineteenth Day of November, 2002

*Attest:*

*Attesting Officer*

JAMES E. ROGAN
*Director of the United States Patent and Trademark Office*